March 19, 1935.   R. E. ASBURY   1,994,744

ELECTRODE SHEATHING HEAD

Filed Dec. 18, 1933

INVENTOR,
Ralph E. Asbury
BY Allen & Allen
ATTORNEYS.

Patented Mar. 19, 1935

1,994,744

UNITED STATES PATENT OFFICE 1,994,744

ELECTRODE SHEATHING HEAD

Ralph E. Asbury, Middletown, Ohio, assignor to The American Rolling Mill Company, Middletown, Ohio, a corporation of Ohio Application December 18, 1933, Serial No. 702,834

14 Claims. (Cl. 219—8)

My invention is addressed primarily to arc welding practices wherein a paper or fabric strip is fed to the arc by being wrapped about the weld rod. The paper or fabric may contain flux or other materials suitable for arc control, and in general the use of a paper or fabric sheathed electrode or weld rod has for its objects the surrounding of the arc with a neutral atmosphere, the control of flux additions, the addition of carbon to the arc, the protection of the metal by a thin coat of slag, and other similar objects.

My invention is addressed to means for sheathing the weld rod in paper, or impregnated or coated tape, which is withdrawn from a continuous supply or reel, these means also including means for making electrical contact to the weld rod.

Hitherto serious problems have arisen in the procedure hereinabove referred to. It has been suggested to employ a head lying below the means for advancing the weld rod, which head is provided with a channel for the reception of a paper strip, the members forming the channel and adjacent parts of the head being so shaped that the paper as it advances with the weld rod is wrapped about the weld rod to form a sheath. It is necessary to make electrical connection with the weld rod at a point as close to the work as possible, due to the relatively high resistance of the weld rod, particularly in welding ferrous metals, and due to the high current concentration therein. Unless this is done the weld rod becomes unduly heated by the passage of current therethrough. Since the function of the paper is not fully subserved unless the paper can be carried to the actual arc substantially in an unburned and uncarbonized condition, undue heating of the weld rod above the arc must be prevented. While the continuous feeding of the weld rod will, in part at least, tend to nullify the heating of upper portions of the rod by conduction, yet the paper will be burned before it reaches the arc if great heat is being developed in the weld rod itself, by the passage of the electric current therethrough. As a consequence, attempts to cool electrode sheathing heads in the past have not been successful.

In the sheathing heads of the prior art, the paper after entering the head has been caught between the weld rod and a fixed roll so that the movement of the weld rod will carry the paper with it by friction. Opposite the roll the weld rod is backed up by a fixed anvil which is also a means for making electrical contact with the weld rod. Since considerable pressure must be employed if the paper is to be fed, the action of the roll has been to bend the weld rod slightly so that it has essentially a point contact with the anvil. With the heavy currents used in arc welding, this point contact is productive of great heat due to current concentration and its high resistance, so that the paper tends to carbonize at the point where the roll presses it against the weld rod, as a consequence of which it will be no longer fed. Moreover, the use of a fixed anvil and a fixed roll renders the device of uncertain or impossible operation if the weld rod is uneven in thickness or is kinked.

My invention is addressed to the solution of these problems and in particular it has for one of its objects a provision of means whereby a continuous contact may be made with the weld rod throughout a considerable portion of its length, whereby perfect electrical contact is assured and the production of heat in the weld rod by the direct action of the electric current is minimized.

It is another object of my invention to provide a feeding means which will be operative in spite of unevenness or kinks in the weld rod.

It is a further object of my invention to provide a plurality of feeding means, one at least of which lies above the point of initial contact of the conductive anvil with the weld rod, so that if heat is developed at this point sufficient to ruin the strength of the paper, the paper will nevertheless be fed from above.

It is still a further object of my invention to apply cooling means to the electrode or weld rod essentiallly at the place where electrical contact is made therewith and prior to the complete sheathing of the weld rod by the paper strip.

These and other objects of my invention which will be set forth hereinafter, or will be apparent to one skilled in the art, I accomplish by that certain construction and arrangement of parts which I shall now describe in a preferred embodiment, reference being had to the accompanying drawing wherein:—

Figure 2:
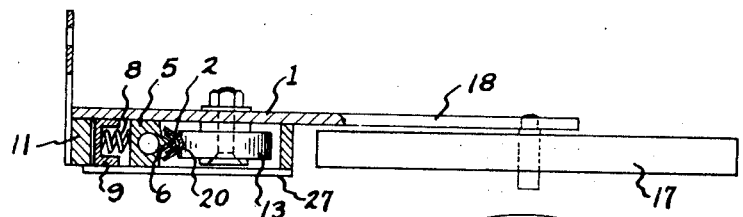
Figure 2 is a horizontal sectional view thereof taken along the lines 2—2 of Figure 1.
Figure 1:
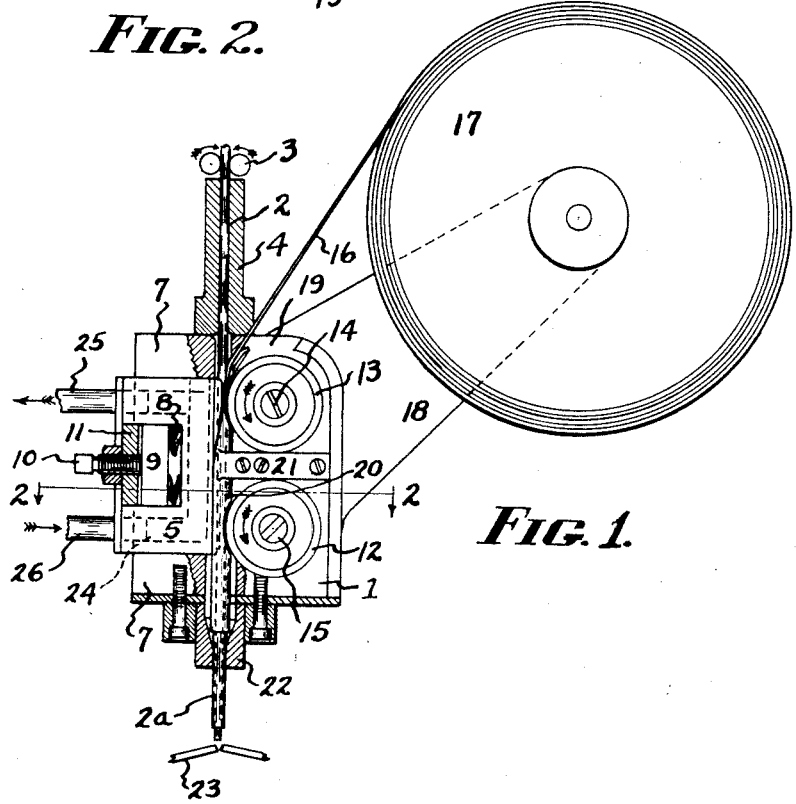
Figure 1 is a vertical sectional view through my sheathing head.
Figure 3:
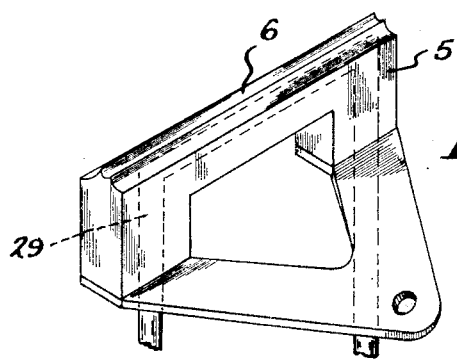
Figure 3 is a perspective view of my anvil and contact member.

Briefly, in the practice of my invention, I provide a sheathing head having a passage way for the weld rod and means whereby a strip of paper can be led against the weld rod from one side. Upon the opposite side of the weld rod there is an anvil and contact member of appreciable length grooved to fit the weld rod. I cause the paper to be pressed against the weld rod and the weld rod against the anvil by a plurality of pressure means interspaced along the length of the anvil, which pressure means may conveniently take the form of rollers. Supplementary means are employed to curve the paper about the weld rod; and below the anvil there is the usual nozzle or outlet member so shaped within as to complete the sheathing of the weld rod in the paper. Instead of attempting to cool the nozzle or outlet member or adjacent parts (which may be done if desired, but is not wholly effective for my purpose, because if the source of heat lies in the weld rod the paper would be destroyed in spite of such cooling, since the weld rod is insulated from the nozzle by the paper) I cool the rod directly, prior to completely encasing it in paper, and at the place where electrical contact is made therewith. The provision of a plurality of pressure means insures contact between the anvil and the weld rod at a plurality of points whereby the resistance heating effect of poor contacts is avoided. This is true even if the weld rod be deflected by the pressure members or be uneven, since the anvil will tend to wear to conform to the particular path of movement of the weld rod, and to make contact therewith substantially throughout the entire length of the anvil. Resiliency is provided in the system so that a kinked or uneven weld rod will be accommodated without stoppage of the feeding of the paper.

I shall now describe in detail an exemplary embodiment of my device, it being understood that modifications may be made therein without departing from the spirit of my invention.

I have shown at 1 the casing of my device. The weld rod passing therethrough is indicated at 2. I have indicated diagrammatically at 3 above my sheathing head, feeding means for the weld rod. A sleeve 4 may be used to conduct the weld rod to the interior of the casing 1, without permitting the bending thereof. In the casing I have provided an anvil member indicated generally at 5, having an extending face grooved as at 6 to receive the weld rod. This anvil is slidable horizontally between abutment members 7 on the casing 1; the anvil member is formed as shown, essentially in a U shape in my preferred embodiment. In the hollow of the U, I provide resilient pressing means comprising coiled springs 8 in a yoke 9, which is controlled by a set screw 10 in an abutment 11 on the casing. The springs held in the yoke press against the anvil and urge it resiliently against the weld rod.

Opposite the anvil I have provided pressure means in the form of rolls 12 and 13, which rolls, since they are quite small, may be conveniently made in the form of ball bearing members journalled as at 14 and 15. The paper strip 16 being drawn from a reel 17 on an arm 18 attached to the casing 1, passes into the casing through an opening 19, and is pressed against the weld rod 2, by the rolls 12 and 13. A guide member for the paper shown at 20 is supported in the casing by means 21 and is bent so as to distort the paper out of flat form into a U shaped form, partly surrounding the weld rod. A nozzle 22 serves as an exit member for the weld rod and completes the process of wrapping the paper strip 16 about the weld rod. The sheathed weld rod is indicated at 2a, extending downwardly to the work 23.

In my device the direct heating of the weld rod by the electric current is largely prevented by the greater area of electrical contact which I am enabled, by my construction, to make. As a consequence of this, any tendency to burn the paper while the device is in continuous operation is practically eliminated, and I am able as a continuous operation to feed the sheathed electrode 2a to the arc, and to cause the paper to burn at the arc, which is the condition desired. It will, of course, be evident that if the feeding of the weld rod is stopped, heat will be carried by the weld rod by conduction, and will tend to burn the paper. It is relatively ineffective to attempt to cool the nozzle 22 and adjacent parts since the heat is originating in the weld rod, which is inside the paper sheath, although such cooling may be employed as an added precaution, if desired. I have discovered that the place at which effective cooling may be applied to my structure is at the anvil, since the anvil contacts the weld rod directly with the weld rod prior to its complete sheathing in the paper. I have accordingly shown passage ways 24, formed in my anvil for water cooling, and water cooling pipe connections 25 and 26, whereby I may continuously pass through my anvil a stream of cooling water. I may, however, employ other cooling media, and in particular air, preferring in this event to blow air into the interior of my anvil and permit it to pass out through perforations in the extended portion thereof which contacts the weld rod. It will be noticed in my construction however, that there are a plurality of pressure members or rolls 12 and 13, (the exact number is not a limitation upon my invention), which contact the paper at intervals throughout the length of the anvil. It is possible by cooling the anvil to cool the weld rod to non-carbonizing temperature. Thus, if upon stopping the feed of the weld rod, the paper should carbonize back to the point of contact of the roller 12, so that this roller would no longer act to feed the paper, yet the paper will be fed upon renewal of the motion of the weld rod, by the action of the roll 13, or such additional pressure devices as may be employed.

The casing may be completed by a face plate 27 or not, as desired, or a glass window may be substituted or provided in the face plate, in order to permit inspection during operation. It will be clear that replacements may be made in this device with facility.

It may also be pointed out that in my specific embodiment the flat, water-cooled sides of my anvil member 5, lying against the back plate 1 of the casing, and the abutments 7 thereon, help to absorb heat from the casing and thus to lower the temperature of the entire head.

The anvil may, of course, be fixedly mounted in the casing and the rollers 12 and 13 resiliently mounted, if desired.

Having thus described my invention, what I claim as new and desire to secure by Letters Patent, is:

1. In an electrode sheathing device, means for effecting the passage of a weld rod, an anvil located upon one side of said weld rod and of substantial length, means for guiding paper to said weld rod and wrapping said paper thereabout, and a plurality of means along the length of said anvil for pressing said paper and said weld rod together and pressing said weld rod and said anvil together.

2. In an electrode sheathing device, means for effecting the passage of a weld rod, an anvil located upon one side of said weld rod and of substantial length, means for guiding paper to said weld rod and wrapping said paper thereabout, and a plurality of means along the length of said anvil for pressing said paper and said weld rod together and pressing said weld rod and said anvil together, and means for cooling said anvil.

3. In an electrode sheathing device, means for effecting the passage of a weld rod, an anvil located upon one side of said weld rod and of substantial length, means for guiding paper to said weld rod and wrapping said paper thereabout, and a plurality of means along the length of said anvil for pressing said paper and said weld rod together and pressing said weld rod and said anvil together, water cooling passages in said anvil and inlet and outlet water connections for maintaining a flow of cooling water through said anvil.

4. In an electrode sheathing device, means for effecting the passage of a weld rod, an anvil located upon one side of said weld rod and of substantial length, means for guiding paper to said weld rod and wrapping said paper thereabout, and a plurality of means along the length of said anvil for pressing said paper and said weld rod together and pressing said weld rod and said anvil together, said means resiliently urging said anvil toward said weld rod.

5. In an electrode sheathing head, means for effecting the passage of a weld rod and of a paper strip, means for encasing said weld rod in said paper strip, contact means for making electrical contact with said weld rod throughout a substantial portion of its length and means for pressing said paper and said weld rod together so as to cause effective unitary passage of said weld rod and said paper, said last mentioned means being located essentially above the point of final contact between said contact means and said weld rod.

6. In an electrode sheathing head, means for effecting the passage of a weld rod and of a paper strip, means for encasing said weld rod in said paper strip, contact means for making electrical contact with said weld rod throughout a substantial portion of its length and means for pressing said paper and said weld rod together so as to cause effective unitary passage of said weld rod and said paper, said last mentioned means being located essentially above the point of final contact between said contact means and said weld rod, and means for cooling said weld rod at least at the area of contact thereof with said contact means.

7. In an electrode sheathing head, means for effecting the passage of a weld rod and of a sheathing strip, means for wrapping said strip about said weld rod, means for producing a frictional feeding contact between said strip and said weld rod and means for cooling said weld rod over at least a portion of the area of said frictional contact.

8. In an electrode sheathing device, means for effecting the passage of a weld rod and of a sheathing strip, means for making electrical contact with said weld rod, means for cooling said weld rod and means for feeding said strip, an effective portion at least of said last mentioned means being located at a point at which said weld rod is cooled.

9. In an electrode sheathing device, a casing, means for effecting the passage of a weld rod and of a sheathing strip, means for wrapping said sheathing strip about said weld rod, an anvil having a portion for contacting said weld rod throughout a substantial portion of its length and a plurality of means for pressing said strip and said weld rod together and pressing said weld rod and said anvil together, and means providing resiliency in said system to allow for physical variations in said weld rod.

10. In an electrode sheathing device, a casing, means for effecting the passage of a weld rod and of a sheathing strip, means for wrapping said sheathing strip about said weld rod, an anvil having a portion for contacting said weld rod throughout a substantial portion of its length and a plurality of means for pressing said strip and said weld rod together and pressing said weld rod and said anvil together, means providing resiliency in said system to allow for physical variations in said weld rod, and means for cooling said anvil.

11. In an electrode sheathing device, a casing, means for conducting a weld rod to said casing, an anvil having substantial length in said casing and adapted to press against said weld rod, means for the passage of a sheathing strip on the opposite side of said weld rod, means for wrapping said sheathing strip about said weld rod, and means comprising a plurality of pressure rollers mounted in said casing and adapted to press said strip against said weld rod and said weld rod against said anvil.

12. In an electrode sheathing device, a casing, means for conducting a weld rod to said casing, an anvil having substantial length in said casing and adapted to press against said weld rod, means for the passage of a sheathing strip on the opposite side of said weld rod, means for wrapping said sheathing strip about said weld rod, and means comprising a plurality of pressure rollers mounted in said casing and adapted to press said strip against said weld rod and said weld rod against said anvil, said rollers being fixed in said casing and said anvil having resilient means for urging it against said weld rod.

13. In an electrode sheathing device, a casing, means for conducting a weld rod to said casing, an anvil having substantial length in said casing and adapted to press against said weld rod, means for the passage of a sheathing strip on the opposite side of said weld rod, means for wrapping said sheathing strip about said weld rod, and means comprising a plurality of pressure rollers mounted in said casing and adapted to press said strip against said weld rod and said weld rod against said anvil, said rollers being fixed in said casing and said anvil having resilient means for urging it against said weld rod, and means for cooling said anvil.

14. In an electrode sheathing device, a casing, means for conducting a weld rod to said casing, an anvil having substantial length in said casing and adapted to press against said weld rod, means for the passage of a sheathing strip on the opposite side of said weld rod, means for wrapping said sheathing strip about said weld rod, and means comprising a plurality of pressure rollers mounted in said casing and adapted to press said strip against said weld rod and said weld rod against said anvil, said rollers being fixed in said casing and said anvil having resilient means for urging it against said weld rod, and means for cooling said anvil, said means comprising passages for cooling fluid in said anvil and inlet and delivery connections thereto.

RALPH E. ASBURY.